(12) United States Patent
Akselrod et al.

(10) Patent No.: US 9,569,791 B2
(45) Date of Patent: *Feb. 14, 2017

(54) ELECTRONIC COMMERCE WEB PAGE MANAGEMENT

(71) Applicant: International Business Machines Corporation, Armonk, NY (US)

(72) Inventors: Ben Z. Akselrod, Toronto (CA); Anthony Di Loreto, Markham (CA); Steve McDuff, Markham (CA); Kyle Robeson, North York (CA)

(73) Assignee: International Business Machines Corporation, Armonk, NY (US)

( * ) Notice: Subject to any disclaimer, the term of this patent is extended or adjusted under 35 U.S.C. 154(b) by 231 days.

This patent is subject to a terminal disclaimer.

(21) Appl. No.: 14/265,466

(22) Filed: Apr. 30, 2014

(65) Prior Publication Data

US 2015/0317399 A1  Nov. 5, 2015

(51) Int. Cl.
*G06F 7/04* (2006.01)
*G06F 17/30* (2006.01)
(Continued)

(52) U.S. Cl.
CPC .......... *G06Q 30/06* (2013.01); *G06F 17/3089* (2013.01); *G06F 17/30554* (2013.01); *G06F 17/30864* (2013.01); *G06F 17/30867* (2013.01); *G06F 17/30905* (2013.01); *G06Q 30/0641* (2013.01); *H04L 67/02* (2013.01); *H04L 67/36* (2013.01)

(58) Field of Classification Search
CPC ............ G06F 17/30554; G06F 17/3089; G06F 17/30905; G06F 9/542; G06F 17/30864; G06F 17/30867; G06Q 30/0641; G06Q 30/0639; G06G 30/01
See application file for complete search history.

(56) References Cited

U.S. PATENT DOCUMENTS 8,352,852 B2    1/2013  Heute
2002/0194151 A1* 12/2002  Fenton ............... G06F 17/3089
(Continued)

FOREIGN PATENT DOCUMENTS

WO    02046953 A1   6/2002

OTHER PUBLICATIONS

List of IBM Patents or Patent Applications Treated as Related, Signed Aug. 13, 2015, 2 pages.

*Primary Examiner* — Bruce Moser
(74) *Attorney, Agent, or Firm* — Scott S. Dobson

(57) ABSTRACT

Aspects of the present disclosure are directed toward a method, a system, and a computer program product for displaying a change event for a web page. The method includes receiving a change event location located on a web page in a pre-deployment environment. The method includes querying a database to return a plurality of change events for the change event location within a duration period. The duration period includes a start time and an end time. The method includes displaying the plurality of change events from the query. The method includes prioritizing the plurality of change events from the query. The method includes selecting an active change event from the plurality of change events based on the priority. The method also includes displaying the active change event to a user.

12 Claims, 6 Drawing Sheets

(51) Int. Cl.
   *G06Q 30/06*     (2012.01)
   *H04L 29/08*     (2006.01)

(56) References Cited

U.S. PATENT DOCUMENTS

| | | | |
|---|---|---|---|
| 2006/0004910 A1* | 1/2006 | Burd | G06F 17/30893 |
| | | | 709/203 |
| 2006/0217110 A1* | 9/2006 | Othmer | G06Q 30/02 |
| | | | 455/414.1 |
| 2007/0265923 A1* | 11/2007 | Krassner | G06Q 30/02 |
| | | | 705/14.51 |
| 2012/0284629 A1 | 11/2012 | Peters et al. | |
| 2013/0055097 A1* | 2/2013 | Soroca | G06Q 30/0247 |
| | | | 715/738 |
| 2015/0356600 A1 | 12/2015 | Akselrod et al. | |

* cited by examiner

ELECTRONIC COMMERCE WEB PAGE MANAGEMENT

BACKGROUND

The present disclosure relates to web pages, and more specifically, to previewing changes in electronic commerce web pages.

With the growth in electronic commerce (e-commerce), web pages are the first interaction that a customer sees. An electronic retailer may have an electronic storefront to interact with the customer. Any changes that an electronic retailer makes to the storefront can have drastic implications on customer interaction. For example, when a change is made to a price in error, customers may flood an electronic retailer with orders that result in a loss to the electronic retailer. With the growth in the complexity of electronic storefronts, an electronic retailer may need to have increased visibility on the changes in the storefront.

SUMMARY

Aspects of the present disclosure are directed toward a method, a system, and a computer program product for displaying a change event for a web page.

One embodiment is directed toward a method for displaying a change event for a web page. The method includes receiving a change event location located on a web page in a pre-deployment environment. The method includes querying a database to return a plurality of change events for the change event location within a duration period. The duration period includes a start time and an end time. The method includes displaying the plurality of change events from the query. The method includes prioritizing the plurality of change events from the query. The method includes selecting an active change event from the plurality of change events based on the priority. The method also includes displaying the active change event to a user.

Another embodiment is directed toward a system for displaying a change event for a web page. The system includes a database configured to store a plurality of change events and change event attributes. Each change event is a future change to content for a web page. The system includes a display, and a processor. The system also includes a memory communicatively coupled to the processor. The memory is encoded with instructions and wherein the instructions when executed by the processor include receiving a change event location located on the web page in a pre-deployment environment. The instructions include querying the database to return a plurality of change events for the change event location within a duration period. The duration period includes a start time and an end time. The instructions include displaying the plurality of change events from the query on the display. The instructions include prioritizing the plurality of change events from the query. The instructions include selecting an active change event from the plurality of change events based on the priority. The instructions also include displaying the active change event to a user via the display.

And yet another embodiment is directed toward a computer program product.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
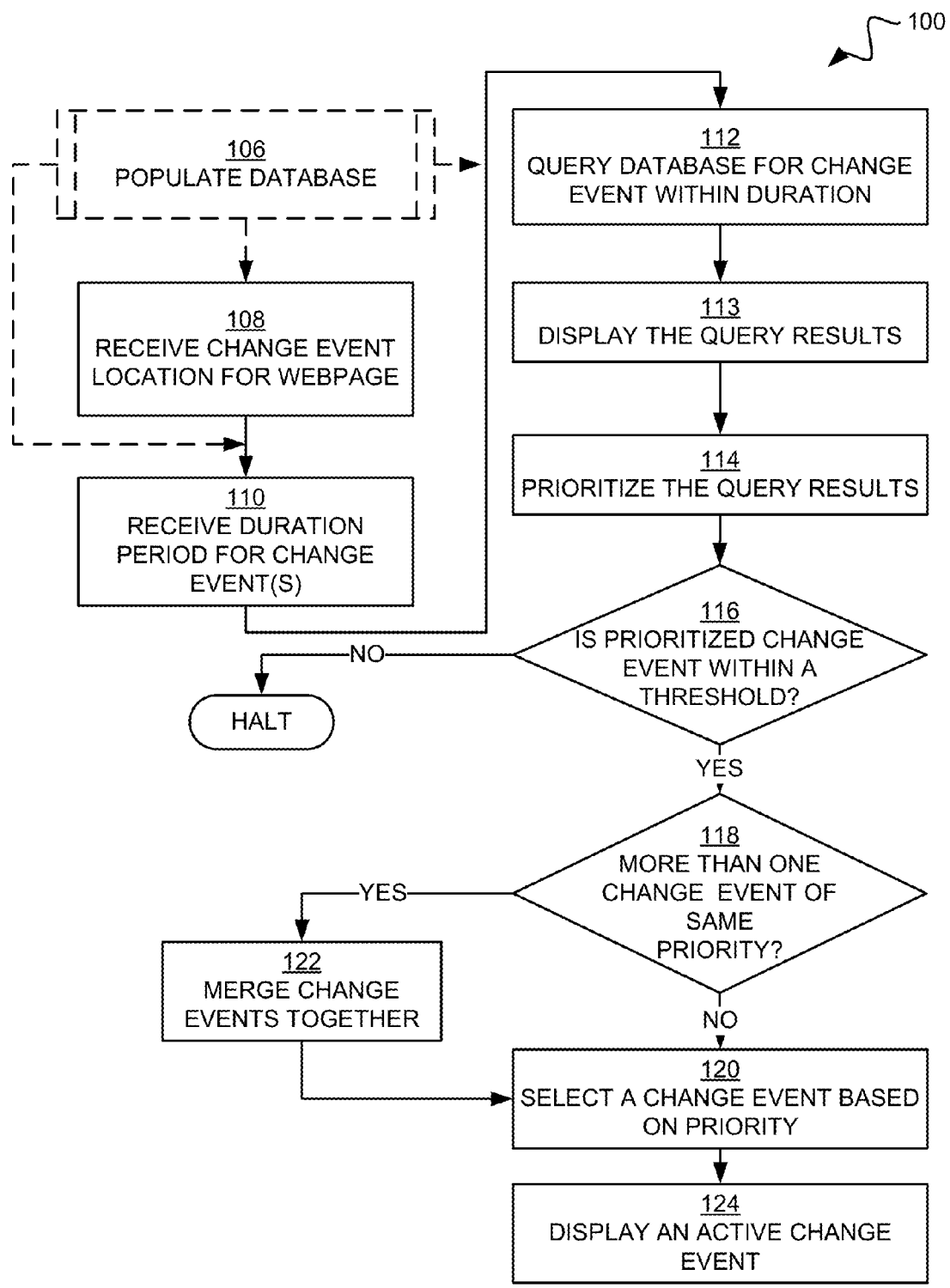
FIG. 1 illustrates a flowchart of a method for selecting and displaying one or more change events for a change event location on a web page, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to web pages, more particular aspects relate to previewing changes in electronic commerce web pages. For instance, aspects of the disclosure relate to selecting an event location located on a web page, and displaying a plurality of web page change events. An active change event can be selected from the plurality of change events based on the priority of the change event. The active change event can be displayed to a user. While the present disclosure is not necessarily limited to such applications, various aspects of the disclosure may be appreciated through a discussion of various examples using this context.

When a web developer or database administrator schedules a future change in the content of a web page, a change event is created. Web pages can have multiple change event locations where a change event occurs. The change event location can refer to a location on a web page and include a web banner, or web page layout element. The change event can refer to changes within the event location and include the content for the banner, for the change event location within a specified duration time.

When retailers typically make changes to e-commerce store fronts, it may be beneficial to review changes to ensure coverage of certain change events. Current techniques to review changes to a change event include setting a fixed future date and visualizing the e-commerce store front at the fixed future date. Current techniques may also include visualizing a calendar of each change event.

Aspects of the present disclosure may allow a user, such as a retailer, to view every store web page over a period of time and facilitate the navigation between the change events. For instance, the changes triggered by a change event, e.g., a promotional banner used for a period of time, might not be synchronized with the changes done by another change event, e.g., a different promotional banner displayed for a period of time. In another example, there may be a gap when nothing is displayed within an area of the web page. Aspects of the present disclosure communicate the gap with the user or several users and display to the user any conflicts of change events that occur at the same time.

FIG. 1 illustrates a flowchart of a method 100 for selecting and displaying one or more change events for a change event location on a web page, according to various embodiments. The method 100 can be directed toward an application with various components. For example, the application may have a change event aggregation module that collects change events to populate a database. The application may also have a timeline assembly module to communicate an active change event to a user. In various embodiments, the application can receive a change event for a change event location on a web page. A plurality of change events can be retrieved from a database and then displayed based on the priority. The method 100 begins at operation 106.

In operation 106, the change event aggregation module can populate a variety of different change events into a database of change events for a particular change event location. In various embodiments, the change event aggregation module can populate the database as a background operation independent from other aspects of method 100, e.g., the querying aspects, or the prioritization aspects of the present disclosure. According to various embodiments, the change event aggregation module can populate the database at any point within the method 100. Ideally the database is populated at any point before the query is performed, e.g., before operation 112 in order for the query to use updated data within the database. For example, the change event aggregation module can populate the database before or after operation 108, operation 110, or before operation 112. Assuming that the change event aggregation module populates the database before operation 108, the method 100 continues to operation 108.

In operation 108, the application can receive the change event location for the change event. A web page can have one or more different change event locations. Examples of change event locations include a banner, an area of a layout, or a toolbar. The change event location can depend on variable content. For example, the change event location can be a section of the web page that has a view generated by another application such as an advertising server. In various embodiments, the view can be generated by a third-party advertisement selection engine.

According to various embodiments, the application can receive the change event location from a user selection that dictates the change event location on which to focus. For example, the user of the application can select all change events for a bottom banner of the web page. This selection can occur prior to the accessing of the database. Once the change event location for the web page is received, then the method 100 continues to operation 110.

In operation 110, the application can receive a duration period for change event within the change event location. The duration period corresponds to a start time and a stop/end time for the change event. The duration period can indicate a period of time to view the change events for the change event location. The application receives the duration period from a user of the application. The user can specify the duration period when specifying the change event location on the web page. In various embodiments, the duration period limits a large amount of change events to include only the change events for the change event location within a particular time period. Operation 110 can be performed concurrently with operation 108, according to various embodiments. When the application receives a duration period for a change event within the change event location, the method 100 continues to operation 112.

In operation 112, the application can query the database for a plurality of change events for the change event location within the duration period. In various embodiments, the change event location can be the primary key with the change events being foreign keys in a relational database. In a non-relational database, the change event location can be the object with the change events being contained within the object. A query of all possible change events for the duration period can be provided for the change event location. Once the database is queried for the plurality of change events for the change event location, then the method 100 continues to operation 113.

In operation 113, the application can display the query results. In various embodiments, the application communicates, visually, with a user and displays the plurality of change events from the query. The query results can be organized in any manner. For example, the query results can be organized by the date of the change event start time. The application can utilize the timeline assembly module to display the change events on a timeline view described further herein. In various embodiments, the changes can also be illustrated on a web page preview view also described further herein. Once the query is displayed, the method 100 continues to operation 114.

In operation 114, the application prioritizes the plurality of change events from the query results. During the prioritization, the change events can be prioritized based on a number of user preferences. For example, the user may indicate that zero gaps, i.e., periods of no content, in change events in a marketing banner is desirable. Therefore, the priority may be high for a change event location with a gap in the duration for a change event. In various embodiments, the user may assign a priority level for a typical change event location based on an inventory level. For example, if the inventory level for a product is low, then a sale for the product, i.e., the change event, can have a lower priority.

The priority for each of the change events can be determined using a prioritization score. The prioritization score can indicate the amount of priority assigned to the change event. The prioritization score can be stored in the database and retrieved during a query. In various embodiments, the prioritization score can be associated with a global variable.

The following is an example of pseudo code for a sample query, display, and prioritization found in operations 112 through operation 114. In this example, a list of marketing banner change events is assumed to include a unique change event identifier, a change event location of the change event (e.g., a header banner), a start time, an end time, a content link to apply (e.g., {web server}/halloween.gif), and a priority of the change events. To pick an active change event, the following query can be used:

```
pickActiveEvent( time, location ) : return one change event {
Select all the change events where :
   - the change event location matches the specified location, and
   - the change event start time is before the specified time, and
   - the change event end time is after the specified time
Sort the results by Priority
Filter the result to only pick the first result
}
```

In another sample query where a list of change events and changes in the active change event occurs over a duration period, then a list of times when either a change event starts or ends can be determined. For each of the time points calculated, an active change event may be selected and the application can adjust the start time and time of the active change event to match the period being calculated.

The type of prioritization can depend on the type of change event. In a data-only change event, some change events include a start date and the action to perform. For example, on date 2014/04/01 at time 14:00, the application receives a change event in the catalog from Spring_Catalog to Summer_Catalog. The data-only change event at 4/01 would have a higher priority than a change event at 2014/02/01.

In a prioritized change, some change events have a start date, end date, a priority, and the action to perform. For example, starting from 2014/04/01 14:00 until 2014/06/01 14:00, using priority 500 for each day, the "header banner" has the content "summer sale". If another change event for "header banner" has the content "generic sale" during the same duration period, but has a priority of 300, then the change event "summer sale" is prioritized over the change event "generic sale".

In various embodiments, the change event priority is measured with respect to other change events overlapping by date with the change event. For example, for a duration period of April 1-April 7, if a first change event takes place on April 1st with a priority of 40, a second change event takes place on April 2nd with a priority of 55, and a third change event takes place on April 1st and lasts through April 3rd with a priority of 30, then for April 1st, the first change event would be higher priority than the third change event. For April 2nd, the second change event would also be a higher priority than the third change event. The priority for the first change event and the second change event would not be comparable in the example. Once the application prioritizes the plurality of change events from the query results, then the method 100 continues to operation 116.

In operation 116, the application determines whether the prioritized change event is within a threshold. For example, if the prioritization score is 74 and the threshold is 80 or above, then the prioritized change event is not within the threshold. The threshold can be based on a quota number. For example, the application may select the top 5 prioritized change events to be within the threshold. If the prioritized change event is determined to be outside of the threshold, then the method 100 can halt. If the prioritized change event is determined to be within the threshold, then the method 100 continues to operation 118.

In operation 118, the application determines whether there is more than one change event of the same priority occurring during the same time, i.e., overlapping. If two or more change events have the same priority for the same change event location, then the method 100 can continue to operation 122. If two or more change events do not have the same priority for the same change event location, then the method 100 continues to operation 120.

In operation 120, the application can select an active change event from the plurality of change events based on the priority for change events occurring simultaneously. The active change event can also be referred to as a winning event. In various embodiments, the active change event is selected from the prioritized change events based on the priority. For example, for a change event location with 2 change events within the duration, a first change event having a priority of 84 and a second change event having a priority of 74, the application selects the first change event. Once the change event is selected in operation 120, the method 100 continues to operation 124.

In operation 124, the application can display the active change event to a user. The active change event can be the same as the selected change event from operation 120 and refer to a change event that is active within the application. The displaying the active change event can occur by a visual indication to the user. The visual indication can be performed in a manner that is visually distinct from the plurality of change events. For example, the display may highlight a particular change event from the plurality of change events by making the particular change event a different color from the plurality of change events.

In operation 122, the application can merge two change events of the same priority and sharing the same content together. The application can select a first change event and a second change event. In various embodiments, both the first change event and the second change event can both share at least a portion of the duration period. For example, if the first change event starts at 0500 and ends at 0645 and the second change event starts at 0600 and ends at 730, then the application can determine that part of the duration period is shared.

The application can merge the first change event and the second change event. In various embodiments, the first change event, i.e., the change event with the earlier start time, can supersede the second change event when merged. For example, if the first change event starts at 0500 and ends at 0645 and the second change event starts at 0600 and ends at 730, then the merged event can result in the first change event ending at 0645 and the start time of the second change event starting at 0646 and ending at 0730. For a smoother transition within a merged event, the end time of the first change event can be immediately before a start time of the second change event. In the aforementioned example, the first change event ending at 0645 can result in the second change event starting at 0646. The immediateness of the ending of the first change event and the start of the second change event can be defined in a time measurement so that there is not a gap in coverage between the first change event and the second change event.

In various embodiments, the merging can occur when two subsequent change events have the same value and a matching end-start date. For example, if a first change event ended at 0645 and a second change event started at 0645 and the two events had the same value, then the two change events could be merged. Once the change events are merged, then the method 100 continues to operation 120 where the application determines which of the change events, including the merged change events, has priority.

Figure 2:
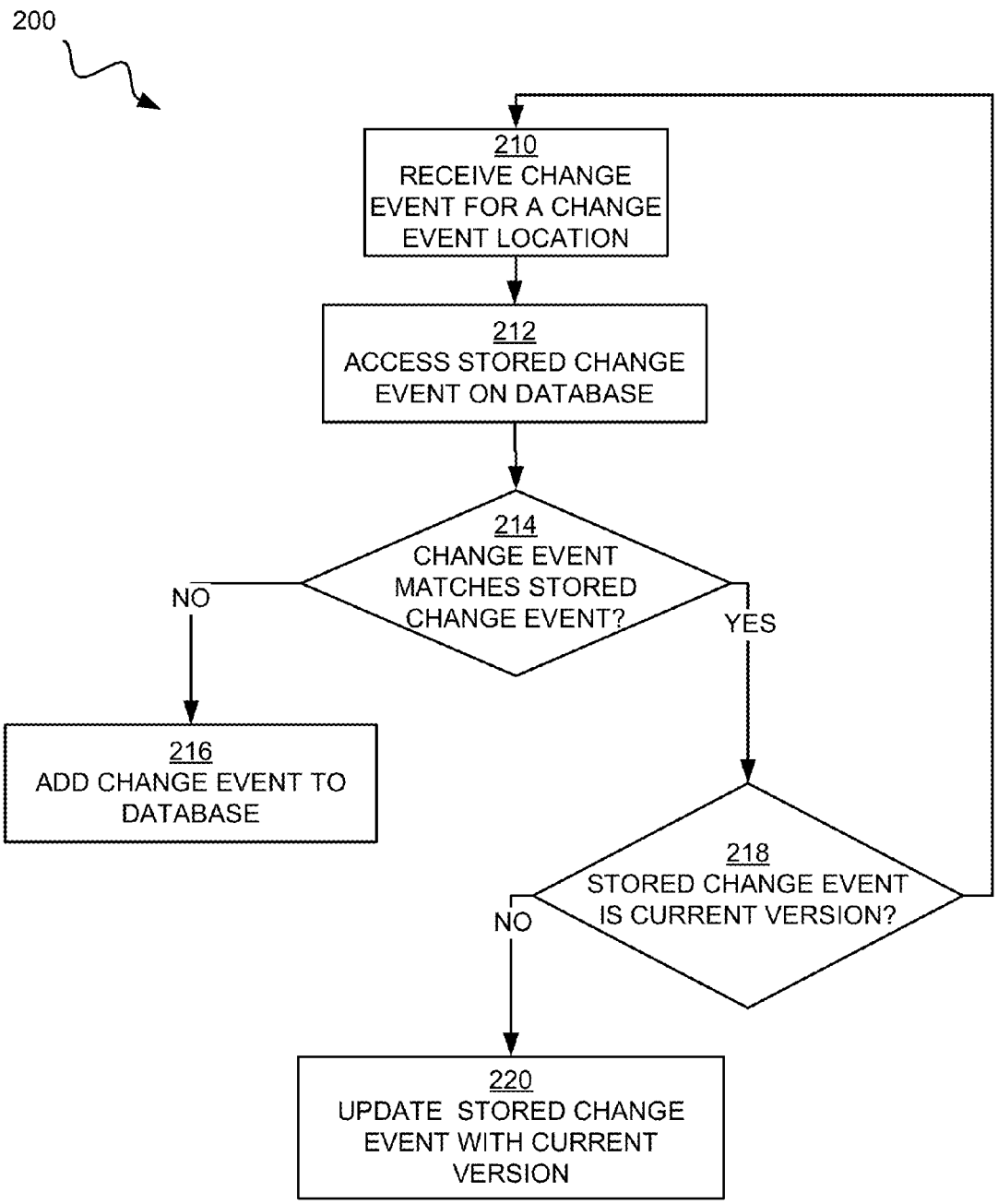
FIG. 2 illustrates a flowchart of a method for populating a database of change events, according to various embodiments.

FIG. 2 illustrates a flowchart of a method 200 for populating a database of change events, according to various embodiments. The database of change events can be a repository for a variety of change events for a change event location in a web page. The method 200 can involve receiving a change event from a web page and determining whether the received change event matches any stored change events already in the database. If so, then the stored change event can be updated with the received change event. The method 200 may correspond to operation 106 from FIG. 1. The method 200 can begin at operation 210.

In operation 210, the change event aggregation module can receive a number of change events that occur within change event locations for the web page. For example, a web page developer can perform a number of future change events for each change event locations on the web page. Each individual change event can be stored in the database. For example, if a promotion on a banner will occur in two weeks and end in three weeks, then the promotion can be stored in the database. In various embodiments, the change events can originate from a test server.

The change events can be monitored for one or more change event attributes. The change event attribute is an attribute that is associated with a change event. For example, if the change event is a promotion, then the change event attribute can be the file of the images involved in the promotion and the start and stop time of the promotion. In another example, if the change event is a price, then the change event attribute can be the start and stop times of the price, the amount, a group that the price is directed toward, and so forth. The change event attribute can be identified by the change event aggregation module, according to various embodiments. After the change event aggregation module receives the change events, then the method 200 continues to operation 212.

In operation 212, the change event aggregation module can access the stored change events from the database. The stored change event is a change event that is located in the database. The stored change event can be associated with one or more change event attributes that describe the stored change event. Once the change event is received by a change event aggregation module, then the change event aggregation module can access the database to see if there is a match with a stored change event in the database. Once the stored change event is accessed, then the method 200 continues to operation 214.

In operation 214, the application can determine whether the received change event matches the stored change event. In various embodiments, the application is checking whether the received change event is already in the database. For example, if the change event that is received is for a Summer promotion but the stored change event is for a Spring promotion, then the application can determine that there is no match. There may be multiple categories of change events. For example, the stored change event may be for a first Summer promotion but the change event is for a second Summer promotion. In this example, there would not be a match. A match between the stored change event and the change event indicates that the change event is already in the database. If the application determines a match between the change event and the stored change event, then the method 200 continues to operation 218. If the application determines that there is not a match between the change event and the stored change event, then the method 200 continues to operation 216 where the application can add the change event to the database.

In operation 218, the application determines whether the stored change event is a current version. The current version of the change event indicates the timestamp of modification closest to the current timestamp. If the application determines that the stored change event, i.e., the change event in the database, is the current version, then the method 200 continues to operation 210. If the application determines that the stored change event is not the current version, then the method 200 continues to operation 220.

In operation 220, the application updates the stored change event with the current version. For example, if the change event is for a marketing promotion for a Summer sale that ends at 0545, but is later modified to end at 0645, then the change event ending at 0645 is a current version. The application can overwrite the change event attribute of the change event, according to various embodiments. In various embodiments, all of the change event attributes of the change event can be overwritten.

Figure 3:
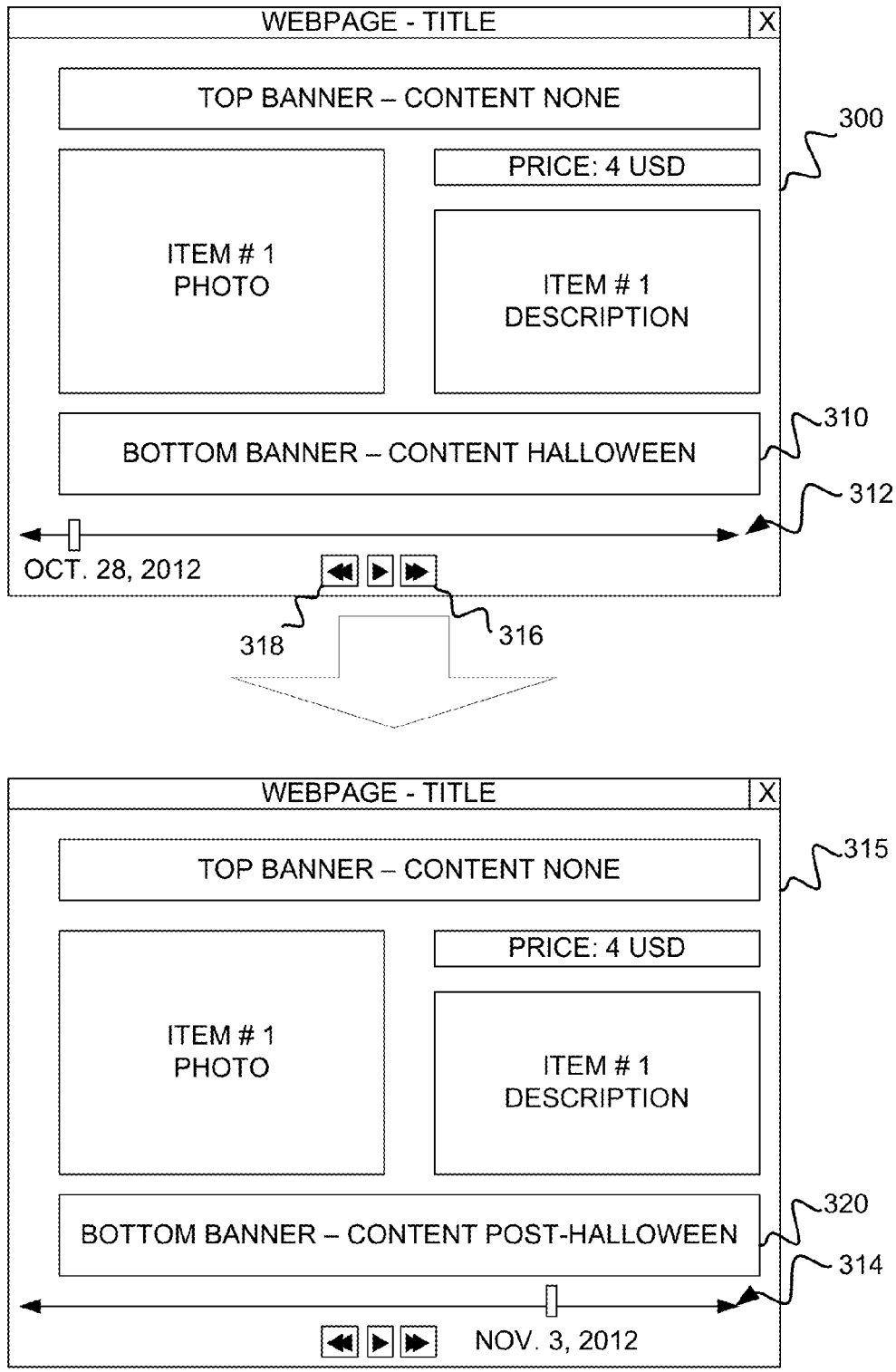
FIG. 3 illustrates two web page views that illustrate change events in a change event location, according to various embodiments.

FIG. 3 illustrates two web page views that illustrate change events in a change event location, according to various embodiments. The first web page view 300 illustrates a view of a plurality of change event locations, e.g., a bottom banner 310. The change event locations can have a change event depending on whether there is a change event. For instance, static content in the change event location will not have a change event.

In the first web page view 300, the bottom banner 310 contains Halloween content. A slider bar 312 can indicate the date the preview is made. In the first web page view 300, the slider bar 312 indicates that the view is for Oct. 28, 2012. The slider bar can have buttons that can be used to navigate the web page view 300. For example, the forward button 316 advances the time and the back button 318 advances the time in a negative direction to correspond to the view.

In the second web page view 315, the slider bar 314 indicates that the view is for Nov. 3, 2012. The slider 314 can be advanced to select the Nov. 3, 2012 date which sets the duration period of the change event, i.e., from the 0001 Nov. 3, 2012 to 2359 Nov. 3, 2012. The bottom banner 320 is configured to display Post-Halloween content on Nov. 3, 2012. In various embodiments, the bottom banner 320 can be highlighted to indicate the change from the Halloween content to the Post-Halloween content. The highlighting can include a flashing around the borders of the bottom banner to indicate that there was a change.

Figure 4:
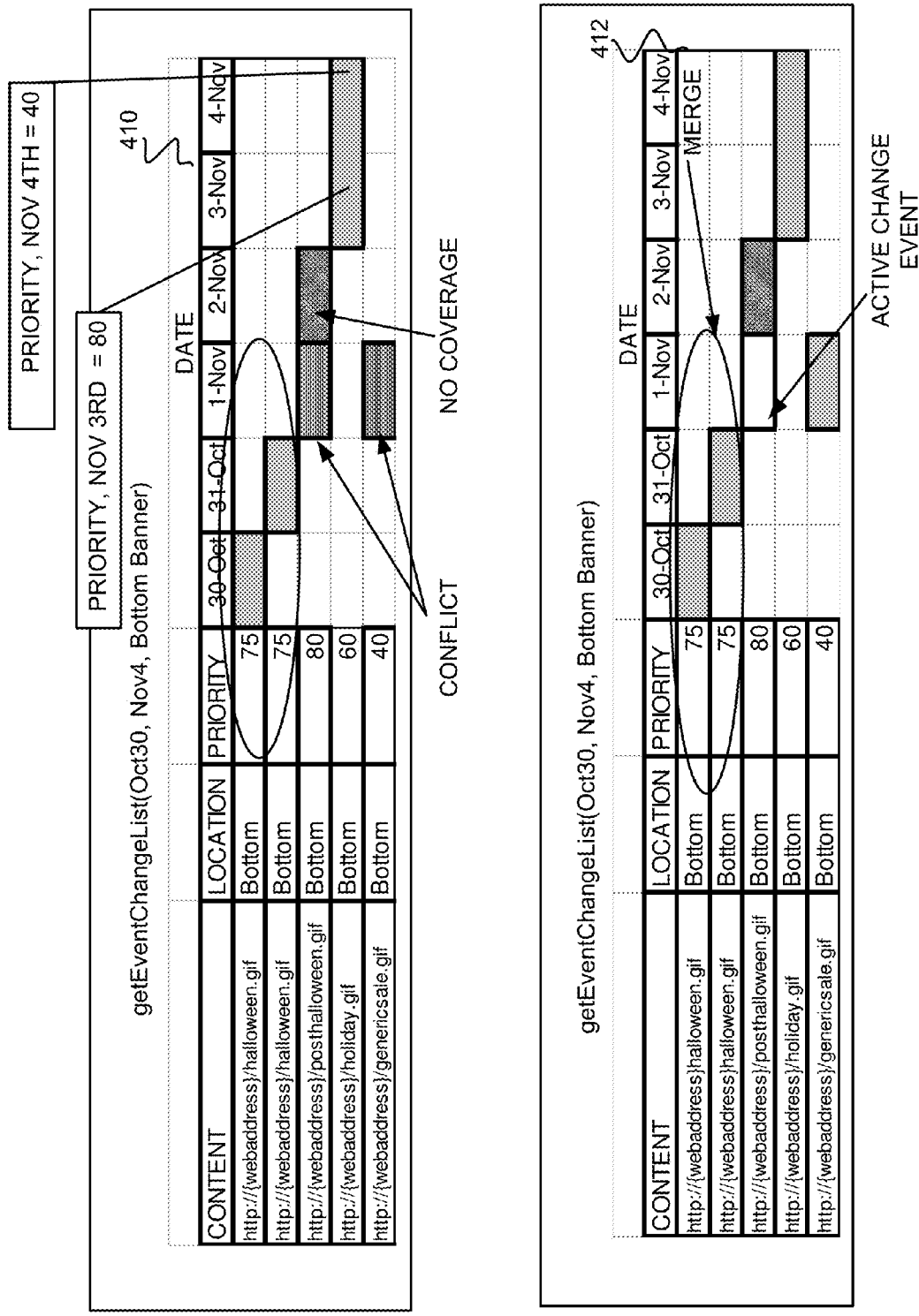
FIG. 4 illustrates two timeline views of the change events, according to various embodiments.

FIG. 4 illustrates two timeline views of the change events, according to various embodiments. The first timeline view 410 is a timeline displaying when all of the change events are in effect. The second timeline view 412 shows a timeline that has merged two similar events and selected a change event based on a priority.

In the first timeline view 410, the change events are assigned a certain priority. The priority for halloween.gif on October 30 and halloween.gif on October 31 are equal. The priority for posthalloween.gif is higher than that of the genericsale.gif. The priorities may be different for different days but the same content. For example, the priority for holiday.gif is higher on November 3 than on November 4. In the first timeline view 410, the priority for the holiday.gif is averaged across both priorities for November 3 and November 4. By measuring the priority for each day, the priority can be specific for a certain period. For example, the priority on October 31 can be 75 for the halloween.gif for the time period before October 31 but the priority can be reduced substantially after October 31. In various embodiments, the change event can maintain the same priority throughout the duration, e.g., holiday.gif has only one priority throughout all days of the duration.

The application can highlight periods of no coverage in the first timeline view 410. The no coverage period is the result of no content. For example, the posthalloween.gif content changes on November 1 but the next promotion, holiday.gif, does not begin until November 3. The application can highlight the no coverage period for the user to make a determination on the action. According to various embodiments, the user can select content to eliminate the no coverage period or the coverage can be filled in automatically by generic content that is active for all days of the duration period.

The content for halloween.gif is effective for two days, October 30 and October 31. Since the change event occurs during two of the days, and both days have the same priority, then the change events can be treated by the application as a single change event. Thus, the application can merge the change event for halloween.gif. The second timeline view 412 shows the merge that occurred between the two change events involving halloween.gif.

The first timeline view 410 illustrates a conflict between the change event involving both posthalloween.gif and genericsale.gif. In this conflict, both content for posthalloween.gif and genericsale.gif affect content for November 1. However, posthalloween.gif has a higher priority than genericsale.gif. Therefore, the application can select posthalloween.gif to use for the active change event. The application can also display, in a visually distinct manner from genericsale.gif, posthalloween.gif. The second timeline view 412 also illustrates the active change event.

In various embodiments, the active change event is the change event that is selected by the application. The application selects the active change event, e.g., posthalloween.gif, based on the priority. In contrast, the inactive (or dormant) change event, e.g., genericsale.gif, has a lower priority than the active change event and is not selected by the application for displaying in a visually distinct manner. In various embodiments, the active change event and the inactive change event can both be displayed simultaneously, but the active change event is displayed to be visually distinct from the inactive change event. For example, genericsale.gif can be displayed in red while posthalloween.gif can be displayed in green when the date November 1st is selected. When the date November 2nd is selected, then the application may lack active change events.

Figure 5:
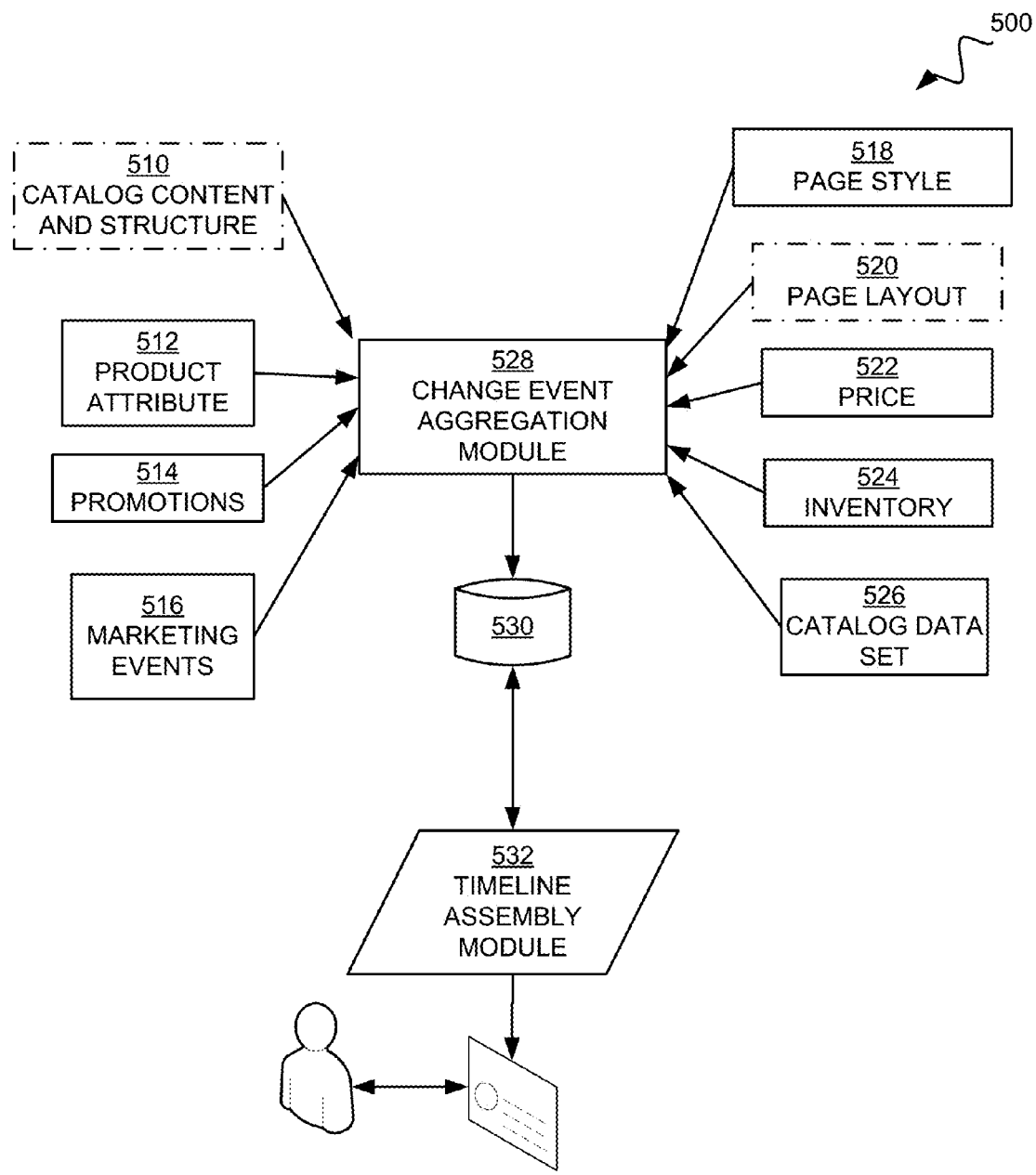
FIG. 5 illustrates an application that receives one or more change events from change event locations on a web page and displays the change events on a timeline, according to various embodiments.

FIG. 5 illustrates an application 500 that receives one or more change events from change event locations on a web page and displays the change events on a timeline, according to various embodiments. The application 500 includes a change event aggregation module 528 and a timeline assembly module 532. The application 500 also interacts with a database 530. Change events are changes that are associated with a particular product or product view on a web page. The change events can include catalog content and structure 510, product attribute 512, promotions 514, marketing events 516, web page style 518, page layout 520, price 522, inventory 524, or catalog data set 526.

The change events can be received by the change event aggregation module 528 while a web page developer or a database administrator plans future change events. The change event aggregation module 528 can add or update any change events into the database 530 in a manner consistent with method 200 in FIG. 2.

The promotions 514 can refer to discounts for the item or factual change event attributes such as the length of time the price is discounted. The marketing events 516 can include brand building events such as a branding campaign to promote a particular soft drink or an electronic mail marketing campaign.

The catalog content and structure 510 can refer to a number of change event attributes. For example, there may be a master catalog and a sales catalog with more specialized products that can be accessed during certain times, e.g. Summer line-up/Fall line-up. The catalog content and structure 510 can refer the categories, e.g., Summer line-up, Halloween, whereas the catalog data set 526 can refer to situations where attributes change over time, e.g., specific Uniform Product Codes.

The page style 518 may change with the introduction of a particular product. The page style 518 can refer to the background of a web page. For example, a product may require emphasis around the borders of the header of a web page during a certain time frame. The page layout 520 can refer to the difference in the physical layout. For example, the header of the web page shifting down. In various embodiments, the page layout 520 can refer to the content of the web page, e.g., an image file, or a banner that receives content from a third-party provider.

The database 530 can further be accessed by a timeline assembly module 532. The timeline assembly module 532 is a component of the application. The timeline assembly module 532 can query the database 530 for change events affecting a change event location during a duration period. The queried results can be prioritized by the application and selected by a user in a timeline view, e.g., the timeline view of FIG. 4. This timeline view can be interacted with by the user. In various embodiments, groups of users can work together as a team. Thus, changes in the web page made by one user can be viewed by another user. Multiple users may configured different data points. For example, if one user made a mistake in coverage, then the other users would see the discrepancy.

The timeline assembly module 532 takes a query on a specific change event location within a page. The timeline assembly module 532 communicates the changes in the change event location of the web page to a user in a visual manner. The visual manner can have the changes between different versions highlighted. For example, with a price 522 change event, a pricing inconsistency between two different prices may result in no price being displayed for a two-day duration period.

Figure 6:
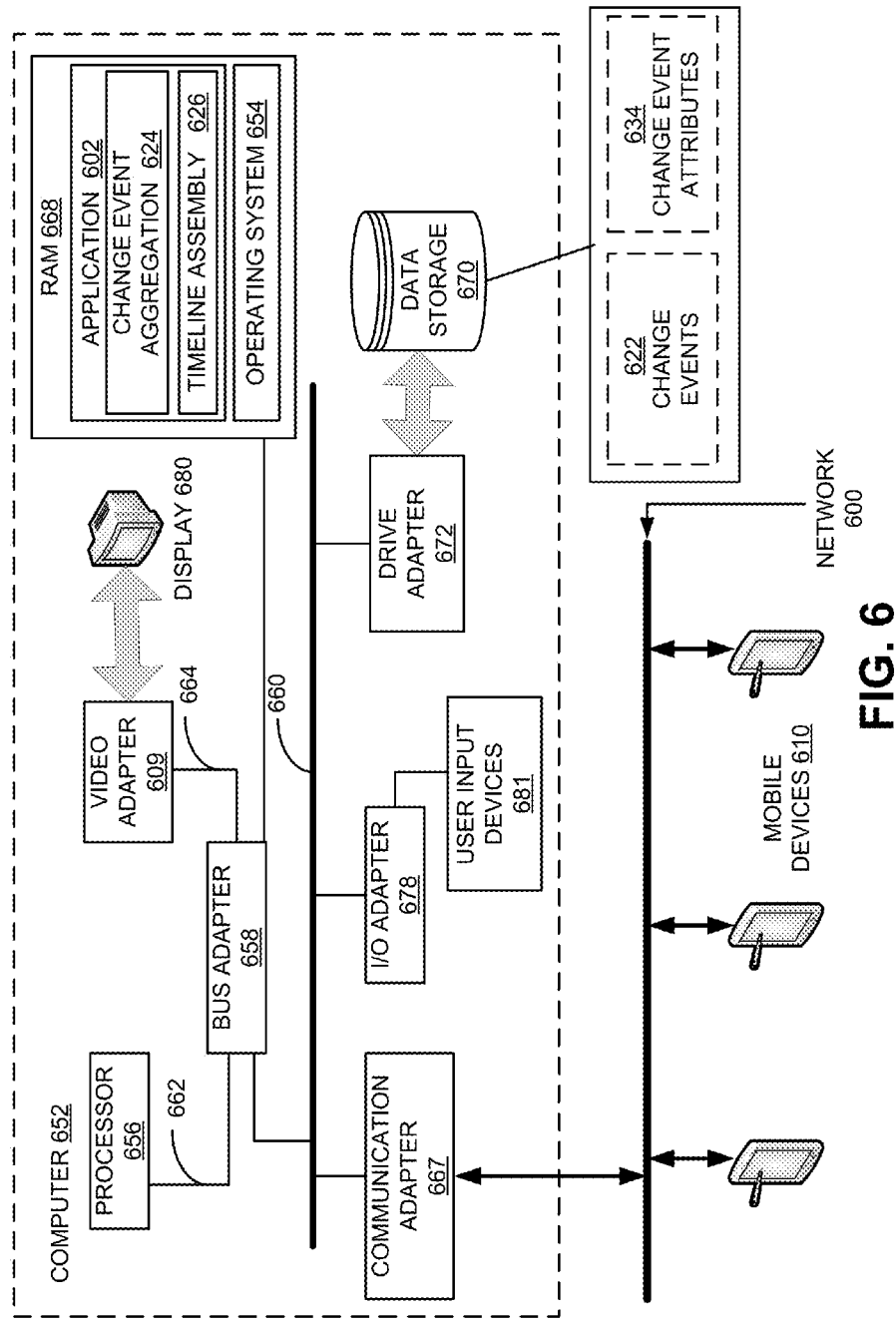
FIG. 6 illustrates a block diagram of automated computing machinery, according to various embodiments.

FIG. 6 illustrates a block diagram of automated computing machinery, according to various embodiments. The computing machinery may include example computer 652 useful in performing aspects of the disclosure, according to various embodiments. The computer 652 of FIG. 6 includes at least one computer processor 656 or 'CPU' as well as random access memory 668 ('RAM') which is connected through bus adapter 658 to processor 656 and to other components of the computer 652.

The RAM 668 may include an application 602. The application 602 can implement the querying of change events, and the prioritization of the change events to display on a timeline view. The application 602 can have a change event aggregation module 624 and a timeline assembly module 626. The change event aggregation module 624 can aggregate one or more change events and populate the change events into the data storage 670. The timeline assembly module 626 can organize the change events into a timeline view. The organizing may include querying the change events 622 from the data storage 670 and prioritizing the query results.

The RAM 568 may include an operating system 654. Operating systems useful for record filtering according to embodiments of the present invention include UNIX®, Linux®, Microsoft XP™, AIX®, IBM's i5/OS™, and others. The operating system 654 are shown in RAM (668), but many components of such software typically are stored in non-volatile memory also, such as, for example, on a disk drive 670.

The computer 652 may also include disk drive adapter 672 coupled through expansion bus 660 and bus adapter 658 to processor 656 and other components of the computer 652. Disk drive adapter 672 connects non-volatile data storage to the computer 652 in the form of disk drive 670. Disk drive adapters useful in computers include Integrated Drive Electronics ('IDE') adapters, Small Computer System Interface ('SCSI') adapters, and others. Non-volatile computer memory also may be implemented for as an optical disk drive, electrically erasable programmable read-only memory (so-called 'EEPROM' or 'Flash' memory), RAM drives, and so on.

The data storage 670 may include one or more storage devices in a tiered or non-tiered configuration. The data storage 670 can include one or more change events 622 that are keyed based on the change event location of a web page in a relational database. In various embodiments, the change event location can be the object in a non-relational database. The change events 622 can be described by change event attributes 634. Each change event attribute 634 may be associated with the change event 622.

The example computer 652 includes one or more input/output ('I/O') adapters 678. I/O adapters implement user-oriented input/output through, for example, software drivers and computer hardware for controlling output to display devices such as computer display screens, as well as user input from user input devices 681 such as keyboards and mice. The example computer 652 includes a video adapter 609, which is an example of an I/O adapter specially designed for graphic output to a display device 680 such as a display screen or computer monitor. Video adapter 609 is connected to processor 656 through a high speed video bus 664, bus adapter 658, and the front side bus 662, which is also a high speed bus.

The example computer 652 includes a communications adapter 667 for data communications with other computers 610, e.g., mobile devices, and for data communications with a data communications network 600. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters include modems for wired dial-up communications, Ethernet (IEEE 802.3) adapters for wired data communications network communications, and IEEE 802.77 adapters for wireless data communications network communications.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system, comprising:
   a database configured to store a plurality of change events and change event attributes, each change event is a future change to content for a web page;
   a display;
   a processor; and
   a memory communicatively coupled to the processor, wherein the memory is encoded with instructions and wherein the instructions when executed by the processor include:
   receiving a change event and one or more change event attributes,
   accessing the database for stored change events,
   determining whether the received change event matches the stored change events,
   adding the received change event to the database in response to the received change event not matching the stored change events,
   receiving a change event location located on the web page in a pre-deployment environment,
   querying the database to return a plurality of change events for the change event location within a duration period, wherein the duration period includes a start time and an end time,
   displaying the plurality of change events from the query on the display,
   prioritizing the plurality of change events from the query,
   selecting a change event from the plurality of change events based on the prioritizing, making the change event an active change event, and
   displaying the active change event to a user via the display.

2. The system of claim 1, wherein the instructions when executed by the processor include:
   determining whether the stored change event is a current version by comparing a timestamp of the change event attributes of the stored change event to a timestamp of the change event attributes of the received change events in response to the received change event matching the stored change event; and
   updating the change event attributes of the stored change event in response the stored change event not being the current version.

3. The system of claim 1, wherein the displaying the plurality of change events from the query includes:
   displaying a timeline view of the change event.

4. The system of claim 1, wherein the instructions when executed by the processor include:
   selecting a first change event and a second change event that both share at least a portion of the duration period; and
   merging the first change event and the second change event.

5. The system of claim 1, wherein an end time of the first change event matches a start time of the second change event.

6. The system of claim 1, wherein the displaying the active change event to the user via the display comprises:
   displaying the active change event in a manner visually distinct from the plurality of change events.

7. A computer program product comprising a computer readable storage device having a computer readable program stored therein, wherein the computer readable program, when executed on a computing device, causes the computing device to:
   receive a change event and one or more change event attributes;
   access a database for stored change events;
   determine whether the received change event matches the stored change events;

add the received change event to the database in response to the received change event not matching the stored change events;
receive a change event location located on a web page in a pre-deployment environment;
query the database to return a plurality of change events for the change event location within a duration period, wherein the duration period includes a start time and an end time;
display the plurality of change events from the query;
prioritize the plurality of change events from the query;
select a change event from the plurality of change events based on the prioritizing, making the change event an active change event; and
display the active change event to a user.

8. The computer program product of claim 7, wherein the computer readable program causes the computing device to:
select a first change event and a second change event that both share at least a portion of the duration period; and
merge the first change event and the second change event.

9. The computer program product of claim 8, wherein an end time of the first change event matches a start time of the second change event.

10. The computer program product of claim 7, wherein the computer readable program causes the computing device to display the active change event by:
displaying the active change event in a manner visually distinct from the plurality of change events.

11. The computer program product of claim 7, wherein the computer readable program causes the computing device to:
determine whether the stored change event is a current version by comparing a timestamp of the change event attributes of the stored change event to a timestamp of the change event attributes of the received change events in response to the received change event matching the stored change event; and
update the change event attributes of the stored change event in response the stored change event not being the current version.

12. The computer program product of claim 7, wherein displaying the plurality of change events from the query includes:
displaying a timeline view of the change event.

* * * * *